United States Patent
Lingafelt et al.

(10) Patent No.: US 8,369,506 B2
(45) Date of Patent: Feb. 5, 2013

(54) INFORMING A TELECONFERENCE PARTICIPANT THAT A PERSON-OF-INTEREST HAS BECOME ACTIVE WITHIN THE TELECONFERENCE

(75) Inventors: Charles Steven Lingafelt, Durham, NC (US); James Thomas Swantek, Canton, GA (US)

(73) Assignee: International Business Machines Corporation, Armonk, NY (US)

( * ) Notice: Subject to any disclaimer, the term of this patent is extended or adjusted under 35 U.S.C. 154(b) by 1006 days.

(21) Appl. No.: 12/399,269

(22) Filed: Mar. 6, 2009

(65) Prior Publication Data

US 2010/0226486 A1 Sep. 9, 2010

(51) Int. Cl.
*H04M 3/42* (2006.01)
*H04L 12/16* (2006.01)

(52) U.S. Cl. ........... 379/202.01; 379/93.21; 379/158; 379/201.01; 370/260; 455/416

(58) Field of Classification Search ............. 379/202.01, 379/90.01, 93.01, 93.17, 93.21, 156, 157, 379/158, 201.01, 207.01; 370/259, 260, 370/261, 262; 455/414.1, 416
See application file for complete search history.

(56) References Cited

U.S. PATENT DOCUMENTS

| | | | |
|---|---|---|---|
| 5,408,518 A | 4/1995 | Yunoki | |
| 5,495,522 A | 2/1996 | Allen et al. | |
| 5,745,380 A | 4/1998 | Sandvoss et al. | |
| 6,563,914 B2 | 5/2003 | Sammon et al. | |
| 6,731,323 B2 | 5/2004 | Doss et al. | |
| 6,798,753 B1 | 9/2004 | Doganata et al. | |
| 6,915,331 B2 | 7/2005 | Fuller et al. | |
| 6,967,672 B1 | 11/2005 | Huber et al. | |
| 7,295,852 B1 | 11/2007 | Davis et al. | |
| 8,019,069 B1 * | 9/2011 | Cyriac et al. | 379/202.01 |
| 2003/0058111 A1 * | 3/2003 | Lee et al. | 340/573.1 |
| 2006/0147009 A1 | 7/2006 | Greenlee | |
| 2007/0115348 A1 * | 5/2007 | Eppel et al. | 348/14.08 |
| 2007/0116226 A1 | 5/2007 | Bennett | |
| 2007/0211141 A1 * | 9/2007 | Christiansen | 348/14.08 |
| 2009/0081949 A1 * | 3/2009 | Silk | 455/3.05 |
| 2010/0220845 A1 * | 9/2010 | Oliver et al. | 379/202.01 |

* cited by examiner

*Primary Examiner* — Rasha Al Aubaidi
*Assistant Examiner* — Khai M Nguyen
(74) *Attorney, Agent, or Firm* — Yee & Associates, P.C.; Arthur J. Samodovitz

(57) ABSTRACT

A method, a computer program product, and a data processing system inform a teleconference participant that a person-of-interest has become active within the teleconference. A user is identified. A person-of-interest, an alert condition, and a notification method are received from the user. The identification, the alert condition, and the notification method are then stored in a person-of-interest data structure. When a user connects to a teleconference, the person-of-interest data structure is retrieved. The teleconference is then monitored for the occurrence of the alert condition. Upon the occurrence of the alert condition, the notification is delivered to the user according to the notification method.

17 Claims, 4 Drawing Sheets

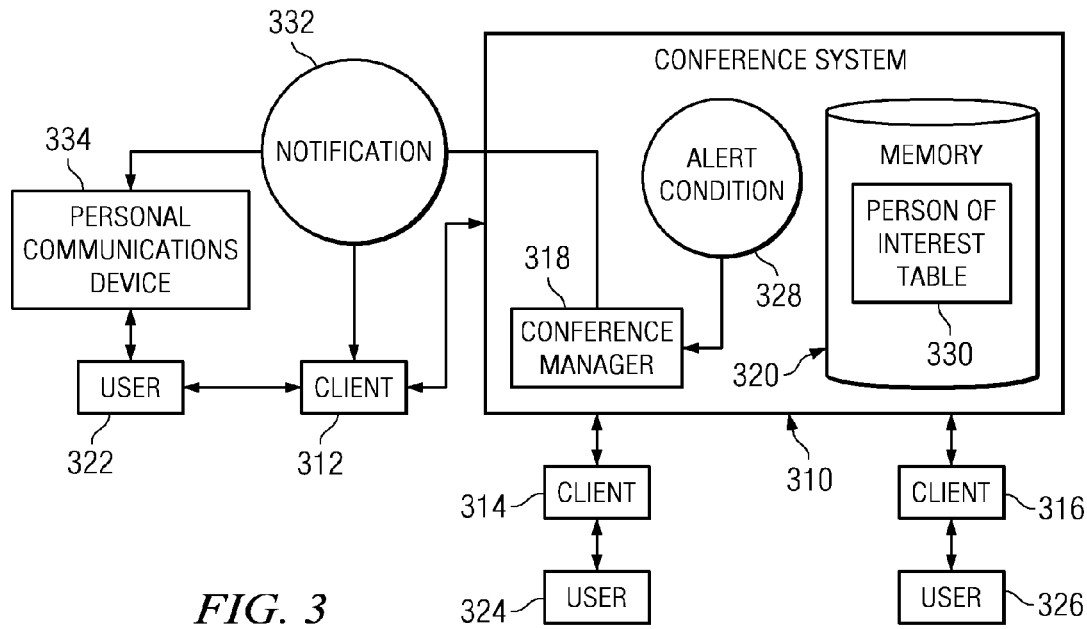

*FIG. 3*

PERSON OF INTEREST
DATA STRUCTURE
400

| USERS COLUMN 402 | PERSONS OF INTEREST 404 | ALERT CONDITIONS 406 | NOTIFICATION METHODS 408 |
|---|---|---|---|
| USER 1 | USER 4 | AT INITIAL CONNECTION | FLASHING NAME |
| USER 1 | USER 5 | AFTER 2 MINUTES CONNECTION | FLASHING NAME AND TEXT MESSAGE TO HANDHELD DEVICE 919-123-4567 |
| USER 1 | USER 7 | 10 WORDS SPOKEN | TONE |
| USER 2 | USER 1 | 100% SILENCE IN 10 MINUTES | TEXT MESSAGE TO HANDHELD AT IP ADDRESS 10.11.12.13 |
| USER 3 | USER 6 | 1 WORD SPOKEN | TONE AND FLASHING NAME |

*FIG. 4*

INFORMING A TELECONFERENCE PARTICIPANT THAT A PERSON-OF-INTEREST HAS BECOME ACTIVE WITHIN THE TELECONFERENCE

BACKGROUND OF THE INVENTION

1. Field of the Invention

The present invention relates generally to a computer implemented method, a data processing system, and a computer program product. More specifically, the present invention relates to a computer implemented method, a data processing system, and a computer program product for informing a teleconference participant that a person-of-interest has become active within the teleconference.

2. Description of the Related Art

Teleconferencing allows three or more persons located in geographically disparate areas, whether in different states, cities, or in different offices of a building, to participate in a telephone call with one another. As businesses strive to cut costs such as travel, meals, and lodging related to "face-to-face" meetings, teleconferencing has continued to gain in popularity.

Many businesses have come to rely upon designated teleconference numbers that can be reserved for a period of use. Each participant can join the conference call, or teleconference, by calling one central teleconference number. If the teleconference number is toll-free, the participants can join the teleconference without having to pay long distance charges or other connection fees. Frequently, each teleconference in which a person is to participate is accessed through a different teleconference number. Many teleconferencing services also require participants to provide some sort of identifier before the participant can be joined to a conference call. The identifier can be a personalized identifier or can be an access code associated with the scheduled teleconference.

Many teleconference systems provide an alert when a new participant joins the conference. However, these systems do not provide notification of the identity of the newly joined party.

BRIEF SUMMARY OF THE INVENTION

The illustrative embodiments provide a computer implemented method, a computer program product, and a data processing system for informing a teleconference participant that a person-of-interest has become active within the teleconference. A user is identified. A person-of-interest, an alert condition, and a notification method is received from the user. The identification, the alert condition, and the notification method are then stored in a person-of-interest data structure. When a user connects to a teleconference, the person-of-interest data structure is retrieved. The teleconference is then monitored for the occurrence of the alert condition. Upon the occurrence of the alert condition, the notification is delivered to the user according to the notification method.

BRIEF DESCRIPTION OF THE SEVERAL VIEWS OF THE DRAWINGS

FIG. 3 is a dataflow for informing a teleconference participant that a person-of-interest has become active within the teleconference according to an illustrative embodiment;

FIG. 4 is a person-of-interest data structure according to an illustrative embodiment;

DETAILED DESCRIPTION OF THE INVENTION

Figure 1:
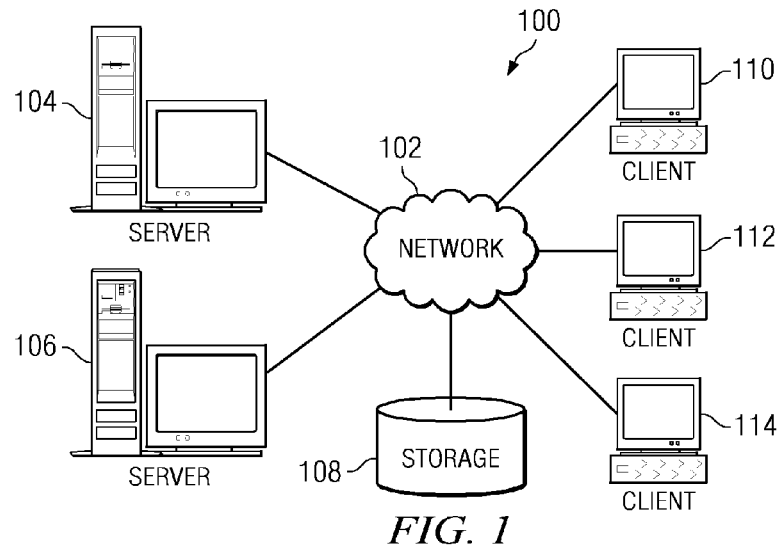
FIG. 1 is a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable data storage medium(s) may be utilized. The computer-usable or computer-readable data storage medium may be, for example but not limited to, an electronic, magnetic, optical, or semiconductor system, apparatus, or device. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable data storage medium may be any medium that can store the program for use by or in connection with the instruction execution system, apparatus, or device.

Computer program code for carrying out operations of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
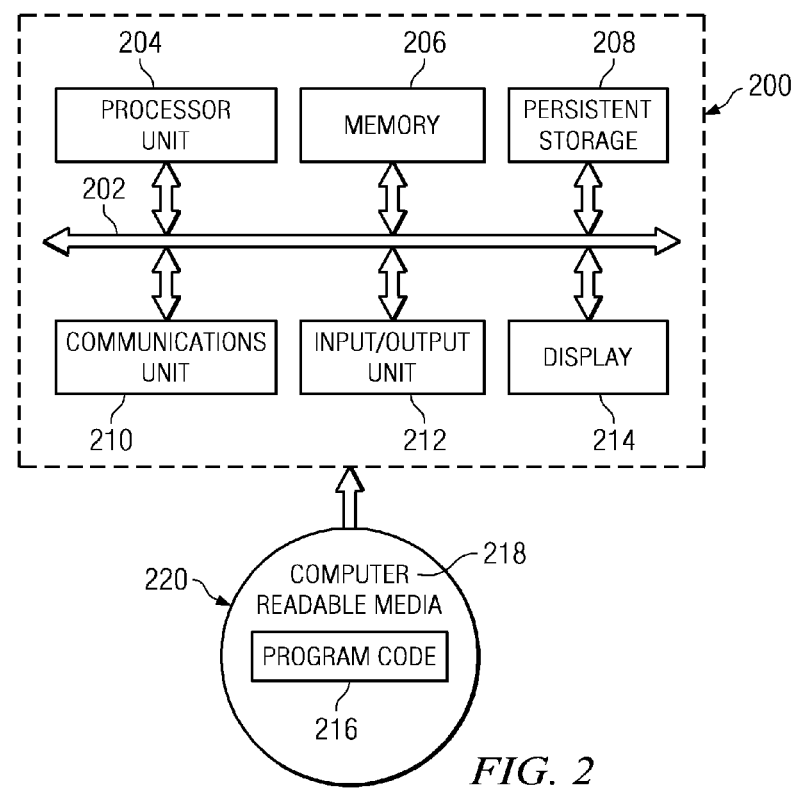
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 of FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code. As one example, the data processing system may include inorganic components integrated with organic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Thus, the illustrative embodiments described herein provide a computer implemented method, a data processing system, and a computer program product for informing a teleconference participant that a person-of-interest has become active within the teleconference. The illustrative embodiments provide a computer implemented method, a computer program product, and a data processing system for informing a teleconference participant that a person-of-interest has become active within the teleconference. A user is identified. A persons-of-interest, an alert condition, and a notification method is received from the user. The identification, the alert condition, and the notification method are then stored in a person-of-interest data structure. When a user connects to a teleconference, the person-of-interest data structure is retrieved. The teleconference is then monitored for the occurrence of the alert condition. Upon the occurrence of the alert condition, the notification is delivered to the user according to the notification method.

Referring now to FIG. 3, a dataflow for informing a teleconference participant that a person-of-interest has become active within the teleconference is shown according to an illustrative embodiment. The dataflow of FIG. 3 can be implemented on the various network-connected components of FIG. 1, such as, for example, conference system 310 can be one of servers 104 and 106 of FIG. 1, and clients 312, 314, and 316 can be clients 110, 112, and 114 of FIG. 1.

Conference system 310 is a data processing system such as one of servers 104 and 106 of FIG. 1 that facilitates teleconference communications between clients 312, 314, and 316. Conference system 310 includes conference manager 318 and memory 320.

Conference manager 318 is control software residing on conference system 310. Conference manager 318 manages teleconferences between clients 312, 314, and 316. Conference manager 318 monitors the connection status of clients 312, 314, and 316 as well as the individual participant activity level of users 322, 324, and 326 during the teleconference. Conference manager 318 also sends alerts to clients 312, 314, and 316 in response to alert condition 328 being met by the connection status or individual participant activity level of other users.

Memory 320 can be one of memory 206 and persistent storage 208 of FIG. 2. Memory 320 is any piece of hardware that is capable of storing information either on a temporary basis and/or a permanent basis. Memory 320 may be, for example, a random access memory or any other suitable volatile or non-volatile storage device. Memory 320 may be a hard drive, a flash memory, a rewritable optical disk, a rewritable magnetic tape, or some combination of the above. Memory 320 may also be a removable hard drive.

Memory 320 stores person-of-interest data structure 330. Person-of-interest data structure 330 stores information regarding specified persons-of-interest, as well as an associated alert condition and notification method. Person-of-interest data structure 330 can be, for example, but is not limited to, an array, a linked list, a vlist, a hash table, a binary tree, a heap, a look-up table, or a buffer.

Alert condition 328 is a contingency circumstance that identifies the conditions under which clients 312, 314, and 316 are notified of the activities of identified persons-of-interest. Alert condition 328 defines an eventuality, the happening of which triggers a notification to be sent to the one of users 322, 324, and 326 who specified alert condition 328. Alert condition 328 can be stored as a data field or as a data structure specifying these eventualities. Alert condition 328 can be for example, but not limited to, a connection to the teleconference by a person-of interest, an exceeding of a individual participant activity level threshold by a person-of-interest, a falling below of an individual participant activity level threshold by a person-of-interest, and a disconnection from the teleconference by a person-of interest.

Notification 332 is a textual display, a visual display, or an audio alert generated by conference manager 318 in response to the occurrence of a contingency defined by alert condition 328. Notification 332 is a visual demarcation or textual alert. The notification can be, but is not limited to, a text message sent to a specified personal communications device, and a flashing of the name of one of users 322, 324, 326 at client 316. Notification 322 is shown being sent to client 312 and personal communication device 334. However, similar notifications can be sent to user 324 at client 314, and user 326 at client 316 based on the defined alert condition, the person-of-interest triggering the notification, and the user who defined the alert condition within person-of-interest data structure 330.

In addition to client 312, notification 332 can also be sent to personal communication device 334. Personal communication device 334 is a device not connected to the conference, but which is capable of receiving an alert message. Personal communication device 334 can be, for example, but is not limited to, a personal digital assistant, a mobile telephone, an e-mail notification, and an instant messaging notification.

Referring now to FIG. 4, a person-of-interest data structure is shown according to an illustrative embodiment. Person-of-interest data structure 400 can be person-of-interest data structure table 330 of FIG. 3.

Person-of-interest data structure 400 includes users 402. Users 402 are indications of which users, such as one of users 322, 324, and 326 of FIG. 3, have defined at least one alert condition. Users 402 contain an entry for each defined alert condition. Users 402 can contain multiple entries for any given user.

Person-of-interest data structure 400 includes persons-of-interest 404. Persons-of-interest 404 is an indication of which users, such as one of users 322, 324, and 326 of FIG. 3, the user indicated in users 402 has been identified as a person-of-interest. For example, in the illustrative person-of-interest data structure 400, user 1 listed in users 402 has identified that user 4, user 5, and user 7 are all persons-of-interest; user 2 has identified that user 1 is a person-of-interest; and user 3 has identified that user 6 is a person-of-interest.

Person-of-interest data structure 400 includes alert conditions 406. Alert conditions 406 can be alert condition 328 of FIG. 3. Alert conditions 406 are a contingency defined by the associated user of users 402. Alert conditions 406 define an eventuality, the happening of which triggers a notification to be sent to the associated client of users 402.

For example, user 1 has defined three (3) separate alert conditions corresponding to each of the persons that user 1 has identified as a person-of-interest. Thus, the alert condition defined by user 1 for person-of-interest user 4 is fulfilled when user 4 initially connects to the teleconference. The alert condition contained within Person-of-interest data structure 400 from user 1 for person-of-interest user 5 is fulfilled after user 5 has been connected to the teleconference for a duration of 2 minutes. The alert condition contained within Person-of-interest data structure 400 from user 1 for person-of-interest user 7 is fulfilled after user 7 has spoken 10 words in the course of the teleconference. The alert condition contained within Person-of-interest data structure 400 from user 2 for person-of-interest user 1 is fulfilled if user 1 remains silent for a specified period of time. The alert condition contained within Person-of-interest data structure 400 from user 3 for person-of-interest user 6 is fulfilled after user 6 has spoken 1 word in the course of the teleconference.

Person-of-interest data structure 400 includes notification methods 408. Notification methods 408 define modes by which a conference manager, such as conference manager 318 of FIG. 3, should inform a user upon the occurrence of an alert condition defined by that user. Thus, notification methods 408 define the format that notification 332 of FIG. 3 should take.

For example, in the illustrative person-of-interest data structure 400, when user 4 initially connects to the teleconference, user 4's name will flash at user 1's client, such as client 312 of FIG. 3. After user 5 has been connected to the teleconference for a duration of 2 minutes, user 5's name flashes at user 1's client. Additionally, a text message is sent to a specified personal communications device, which can be personal communications device 334 of FIG. 3. After user 7 has spoken 10 words in the course of the teleconference, a tone is sounded at user 1's client. If user 1 remains silent for a specified period of time, a text message is sent to user 2 at a specified internet protocol address. After user 6 has spoken 1 word in the course of the teleconference, user 6's name will flash and a tone is sounded at user 3's client.

Figure 5:
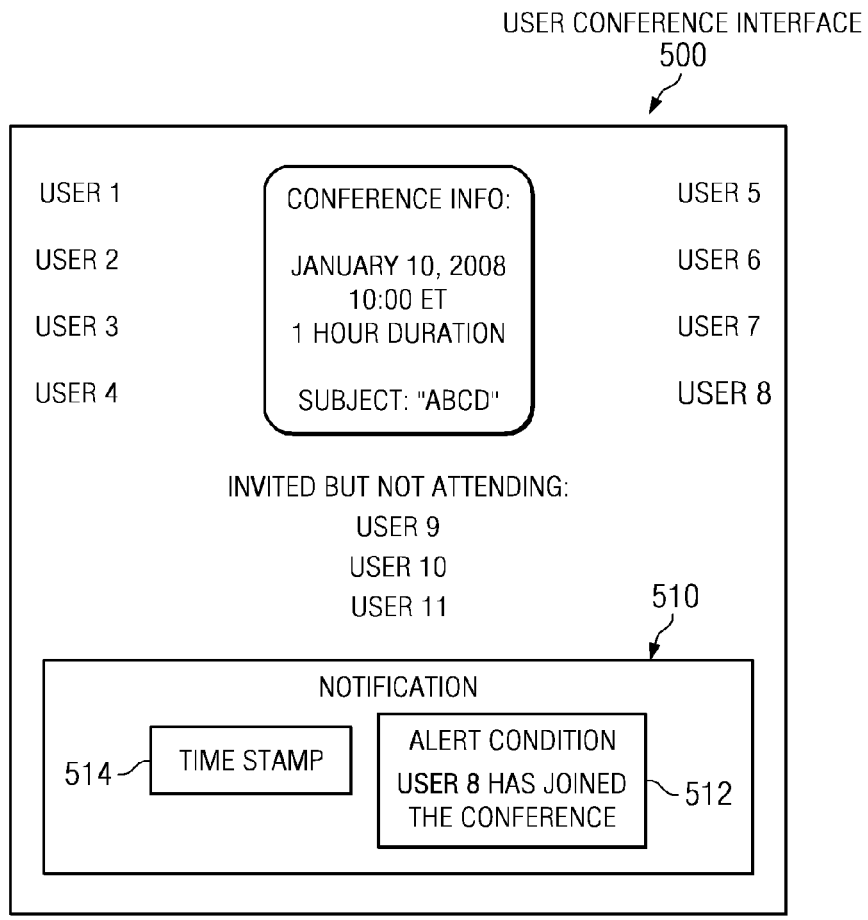
FIG. 5 is a user conference interface according to an illustrative embodiment.

Referring now to FIG. 5, a user conference interface is shown according to an illustrative embodiment. User conference interface 500 is a graphical user interface that allows a user, such as one of users 322, 324, and 326 to connect to a conference by utilizing a client, such as one of clients 312, 314, and 316.

User conference interface 500 is a graphical user interface showing the status of various users that have been invited to participate in a conference. A user, such as one users 322, 324, and 326 that is utilizing user conference interface 500 to connect to the conference has identified user 8 as a person-of-interest. The user has set an alert condition, such as alert condition 328 of FIG. 3, to trigger upon the joining of user 8 to the conference.

When user 8 connects to the conference, user 8's indication is highlighted on user conference interface 500. Additionally, notification 510 is displayed on user conference interface 500. Notification 510 can be notification 332 of FIG. 3.

Notification 510 includes alert condition 512. Alert condition 512 can be alert condition 328 of FIG. 3. Alert condition 512 was previously input by the user into a person-of-interest data structure, such as person-of-interest data structure 400 of FIG. 4. The user sets alert condition 512 for modification through the user conference interface 500 in response to user 8 joining the conference. That is, user 8 joining the conference is the alert condition, such as recorded in alert conditions 406 of FIG. 4, that triggers the occurrence of notification 510 at user conference interface 500.

Notification 510 can include time stamp 514. Time stamp 514 is a sequence of characters, denoting at least one of a date and time at which alert condition 512 occurs and notification 510 is presented in user conference interface 500. By including time stamp 514 in notification 510, a log of the conference history can be maintained, including a record of when the various alert conditions were met. In one embodiment, the recorded log could be input into an application that would automatically generate meeting minutes of the conference call.

Figure 6:
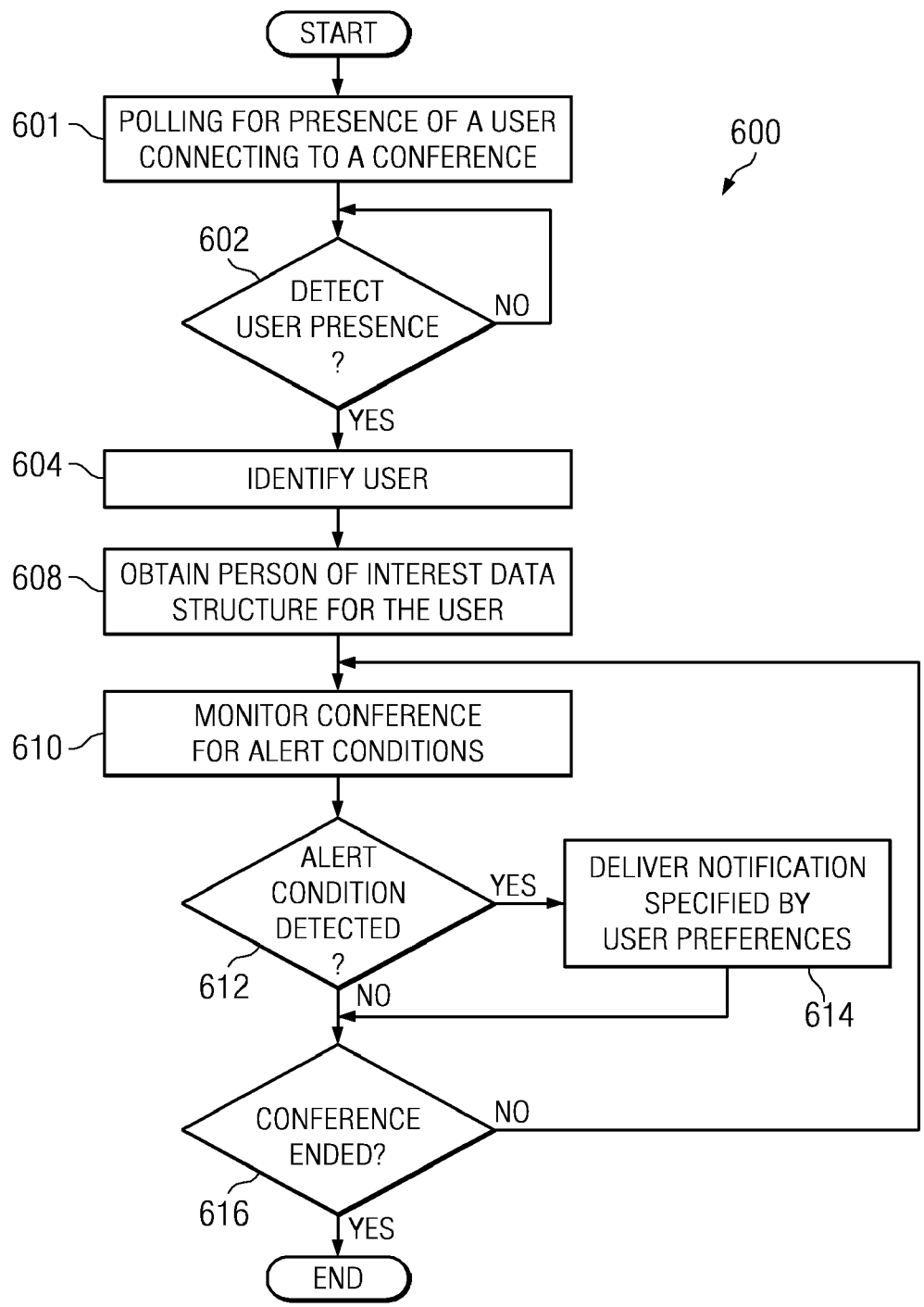
FIG. 6 is a flowchart of processing steps for informing a teleconference participant that a person-of-interest has become active within the teleconference according to an illustrative embodiment.

Referring now to FIG. 6, a flowchart of processing steps for informing a teleconference participant that a person-of-interest has become active within the teleconference is shown according to an illustrative embodiment. Process 600 is a software process, executing on a software component, such as conference manager 318 of FIG. 3.

Process 600 begins by polling for the presence of a user connecting to a conference (step 601). If user presence is not detected ("no" at step 602), process 600 returns to step 601, and continues to poll for a user connection.

Responsive to detecting a user presence ("yes" at step 602), process 600 identifies the user (step 604). In one illustrative embodiment, process 600 can identify the user through an active identification, such as, for example, but not limited to, requiring the user to provide a log-in name or a password. Alternatively, process 600 can identify the user through a passive identification, such as, for example, but not limited to, identifying a cookie within a data processing system of the connecting user.

Responsive to identifying the user, process 600 obtains a person-of-interest data structure for the user (step 608). Process 600 then proceeds to step 610 to monitor for an occurrence of an alert condition (step 610). The alert condition can be alert condition 328 of FIG. 3. The user has previously specified which alert conditions occurrences should be monitored for. Those alert conditions are stored in a person-of-interest data structure, such as person-of-interest data structure 400 of FIG. 4. The alert condition can be, for example, but not limited to, a connection to the teleconference by a person-of interest, an exceeding of a individual participant activity level threshold by a person-of-interest, a falling below of a individual participant activity level threshold by a person-of-interest, and a disconnection from the teleconference by a person-of interest.

If an alert condition is detected ("yes" at step 612), process delivers notification specified by user preferences (step 614). That is, if the alert condition occurs, a notification, such as notification 332 of FIG. 3, is sent to the corresponding user. The notification is sent according to a notification method specified in a person-of interest data structure, such as one of notification methods 408 of FIG. 4.

Responsive to delivering notification, process 600 identifies whether the conference has ended (step 616). If the conference has ended ("yes" at step 616), process 600 terminates. If the conference has not ended ("no" at step 616), process 600 returns to step 610 to monitor for the occurrence of additional alert conditions.

Returning now step 612, responsive to not detecting an alert condition ("no" at step 612), process 600 identifies whether the conference has ended (step 616). If the conference has ended ("yes" at step 616), process 600 terminates. If the conference has not ended ("no" at step 616), process 600 returns to step 610 to monitor for the occurrence of additional alert conditions.

Figure 7:
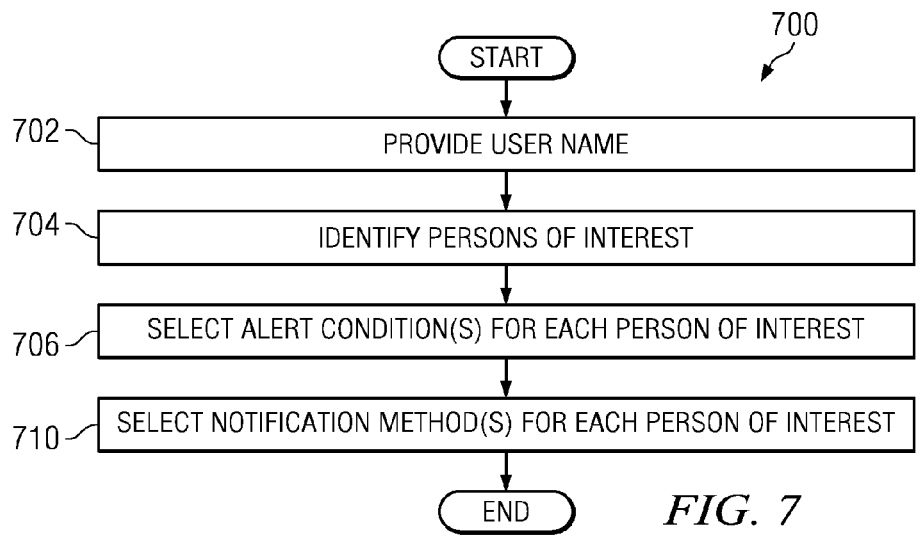
FIG. 7 is a process for specifying an alert condition according to an illustrative embodiment.

Referring now to FIG. 7, a process for specifying an alert condition is shown according to an illustrative embodiment. Process 700 is a software process executing on a client system, such as one of clients 312, 314 and 316 of FIG. 3. Process 700 provides a method by which a user can place entries into a person-of-interest data structure, such as person-of-interest data structure 400 of FIG. 4.

Process 700 begins by providing a user name (step 702). The user name provides a method by which the user can be later identified during a conference call. The user name can be provided through an active identification, such as, for example, but not limited to, requiring the user to provide a log-in name or a password. Alternatively, the user name can be provided through a passive identification, such as, for example, but not limited to, identifying a cookie within a data processing system of the connecting user. The user name is stored within a person-of-interest data structure, such as person-of-interest data structure 400 of FIG. 4.

Responsive to providing a user name, process 700 identifies persons-of-interest (step 704). Persons-of-interest are those invited conference participants which a user of the conference desires to be aware of their joining the conference, leaving the conference, or their individual participant activity level during the conference. Persons-of-interest are identified by the user. Persons-of-interest can be identified by, for example, but not limited to, highlighting a name from within a calendar notice of the meeting and selecting that name as a person of interest; "checking a box" for a name from within a calendar notice of the meeting and selecting that name as a person of interest; and identifying from a drop down menu associated with a name and selecting that name as a person of interest. The persons-of-interest are stored within a person-of-interest data structure, such as person-of-interest data structure 400 of FIG. 4.

Responsive to identifying persons-of-interest, process 700 selects alert conditions for each person of interest (step 706). The alert condition can be alert condition 328 of FIG. 3. The alert condition defines an eventuality, the happening of which triggers a notification to be sent to the user who specified the alert condition. The alert condition can be for example, but not limited to, a connection to the teleconference by a person-of interest, an exceeding of a individual participant activity level threshold by a person-of-interest, a falling below of a individual participant activity level threshold by a person-of-interest, and a disconnection from the teleconference by a person-of interest. The alert condition can be identified by, for example, but not limited to, identifying from an alert condition to be associated with a particular person-of-interest from a drop down menu. The alert conditions are stored within a person-of-interest data structure, such as person-of-interest data structure 400 of FIG. 4.

Responsive to selecting the alert condition, process 700 selects at least one notification method for the person of interest (step 710), with the process terminating thereafter. The notification methods define modes by which a conference manager, such as conference manager 318 of FIG. 3, should inform a user upon the occurrence of an alert condition defined by that user. Thus, the notification methods define the format that a notification should take. The notification method is stored within a person-of-interest data structure, such as person-of-interest data structure 400 of FIG. 4.

Thus, the illustrative embodiments described herein provide a computer implemented method, a data processing system, and a computer program product for informing a teleconference participant that a person-of-interest has become active within the teleconference. The illustrative embodiments provide a computer implemented method, a computer program product, and a data processing system for informing a teleconference participant that a person-of-interest has become active within the teleconference. A user is identifying. A persons-of-interest, an alert condition, and a notification method is received from the user. The identification, the alert condition, and the notification method are then stored in a person-of-interest data structure. When a user connects to a teleconference, the person-of-interest data structure is retrieved. The teleconference is then monitored for the occurrence of the alert condition. Upon the occurrence of the alert condition, the notification is delivered to the user according to the notification method.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable data storage medium providing program code for use by or in connection with a computer or any instruction execution system. For the purposes of this description, a computer-usable or computer readable data storage medium can be any tangible apparatus that can store the program for use by or in connection with the instruction execution system, apparatus, or device.

The medium can be an electronic, magnetic, optical, or semiconductor system (or apparatus or device). Examples of a computer-readable data storage medium include a semiconductor or solid-state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for informing a teleconference participant that a person-of-interest has become active within the teleconference, the method comprising the steps of:
   a computer detecting a first user connecting to a teleconference;
   responsive to detecting the first user connecting to the teleconference, the computer accessing a database to determine whether the first user is identified as a person-of-interest by a second user;
   the computer monitoring teleconference activity from the first user to determine whether the teleconference activity includes an occurrence of at least one alert condition, wherein the at least one alert condition is associated with teleconference activity from the first user in the database, and wherein the at least one alert condition is also associated with the second user in the database;
   responsive to identifying an occurrence of the at least one alert condition within the teleconference activity, the computer sending a notification of the occurrence of the at least one alert condition to a teleconference machine of the second user;
   responsive to receiving an identification of the person-of-interest from the second user, the computer storing the identification of the person-of-interest in the database, and associating the second user with the person-of-interest in the database;
   responsive to receiving the at least one alert condition from the second user, the computer associating the at least one alert condition with both the second user and the person-of-interest in the database; and
   responsive to receiving a notification method from the second user, the computer associating the notification method with the at least one alert condition, the second user and the person-of-interest in the database, wherein the notification method identifies a format that the notification of the occurrence of the at least one alert condition should take.

2. The method of claim 1, wherein the step of the computer detecting the first user connecting to the teleconference further comprises the computer detecting one of the first user connecting to the teleconference by receiving a log-in name from the first user, receiving a password from the first user, and identifying a cookie on a data processing system of the first user.

3. The method of claim 1, wherein the at least one alert condition is selected from the group consisting of an exceeding of an individual participant activity level threshold by the first user, a falling below of the individual participant activity level threshold by the first user, and a disconnection from the teleconference by the first user.

4. The method of claim 1, wherein the notification method is selected from the group consisting of flashing a name of the first user, sending a text message to a personal communications device, sending a text message to an internet protocol address, and sounding a tone.

5. The method of claim 1, wherein the notification includes a timestamp indicating a time of the occurrence of the at least one alert condition.

6. The method of claim 5, further comprising the step of:
the computer maintaining a log history of the teleconference, wherein the log history includes a record of the occurrence of the at least one alert condition as indicated by the timestamp.

7. A computer program product for informing a teleconference participant that a person-of-interest has become active within the teleconference, the computer program product comprising:
one or more computer-readable tangible storage devices;
program instructions, stored on at least one of the one or more storage devices, to detect a first user connecting to a teleconference;
program instructions, stored on at least one of the one or more storage devices, responsive to detecting the first user connecting to the teleconference, to access a database to determine whether the first user is identified as a person-of-interest by a second user;
program instructions, stored on at least one of the one or more storage devices, to monitor teleconference activity from the first user to determine whether the teleconference activity includes an occurrence of at least one alert condition, wherein the at least one alert condition is associated with teleconference activity from the first user in the database, and wherein the at least one alert condition is also associated with the second user in the database;
program instructions, stored on at least one of the one or more storage devices, responsive to identifying an occurrence of the at least one alert condition within the teleconference activity, to send a notification of the occurrence of the at least one alert condition to a teleconference machine of the second user;
program instructions, stored on at least one of the one or more storage devices, responsive to receiving an identification of the person-of interest from the second user, to store the identification of the person-of-interest in the database, and to associate the second user with the person-of-interest in the database;
program instructions, stored on at least one of the one or more storage devices, responsive to receiving at the least one alert condition from the second user, to associate the at least one alert condition with both the second user and the person-of-interest in the database; and
program instructions, stored on at least one of the one or more storage devices, responsive to receiving a notification method from the second user, to associate the notification method with the at least one alert condition, the second user and the person-of-interest in the database, wherein the notification method identifies a format that the notification of the occurrence of the at least one alert condition should take.

8. The computer program product readable medium of claim 7, wherein the program instructions to detect the first user connecting to the teleconference comprise program instructions to detect the first user connecting to the teleconference by one of receiving a log-in name from the first user, receiving a password from the first user, and identifying a cookie on a data processing system of the first user.

9. The computer program product of claim 7, wherein the at least one alert condition is selected from the group of alert conditions consisting of an exceeding of an individual participant activity level threshold by the first user, a falling below of the individual participant activity level threshold by the first user, and a disconnection from the teleconference by the first user.

10. The computer program product of claim 7, wherein the notification method is selected from the group consisting of flashing a name of the first user, sending a text message to a personal communications device, sending a text message to an internet protocol address, and sounding a tone.

11. The computer program product of claim 7, wherein the notification includes a timestamp indicating a time of the occurrence of the at least one alert condition.

12. The computer program product of claim 7 further comprising:
program instructions, stored on at least one of the one or more storage devices, to maintain a log history of the teleconference, wherein the log history includes a record of the occurrence of the at least one alert condition as indicated by the timestamp.

13. A computer system for informing a teleconference participant that a person-of-interest has become active within the teleconference, the computer system comprising:
one or more processors, one or more computer-readable memories and one or more computer-readable tangible storage devices;
program instructions, stored on at least one of the one or more storage devices for execution by at least one of the one or more processors via at least one of the one or more memories, to detect a first user connecting to a teleconference;
program instructions, stored on at least one of the one or more storage devices for execution by at least one of the one or more processors via at least one of the one or more memories, responsive to detecting the first user connecting to the teleconference, to access a database to determine whether the first user is identified as a person-of-interest by a second user;
program instructions, stored on at least one of the one or more storage devices for execution by at least one of the one or more processors via at least one of the one or more memories, to monitor teleconference activity from the first user to determine whether the teleconference activity includes an occurrence of at least one alert condition, wherein the at least one alert condition is associated with teleconference activity from the first user in the database, and wherein the at least one alert condition is also associated with the second user in the database;
program instructions, stored on at least one of the one or more storage devices for execution by at least one of the one or more processors via at least one of the one or more memories, responsive to identifying an occurrence of the at least one alert condition within the teleconference activity, to send a notification of the occurrence of the at least one alert condition to a teleconference machine of the second user;

program instructions, stored on at least one of the one or more storage devices for execution by at least one of the one or more processors via at least one of the one or more memories, responsive to receiving an identification of the person-of interest from the second user, to store the identification of the person-of-interest in the database, and to associate the second user with the person-of-interest in the database;

program instructions, stored on at least one of the one or more storage devices for execution by at least one of the one or more processors via at least one of the one or more memories, responsive to receiving the at least one alert condition for the person-of-interest from the second user, to associate the at least one alert condition with both the second user and the person-of-interest in the database; and program instructions, stored on at least one of the one or more storage devices for execution by at least one of the one or more processors via at least one of the one or more memories, responsive to receiving a notification method from the second user, to associate the notification method with the at least one alert condition, the second user and the person-of-interest in the database, wherein the notification method identifies a format that the notification of the occurrence of the at least one alert condition should take.

14. The computer system of claim 13, wherein the program instructions to detect the first user connecting to the teleconference comprise program instructions to detect the first user connecting to the teleconference by one of receiving a log-in name from the first user, receiving a password from the first user, and identifying a cookie on a data processing system of the first user.

15. The computer system of claim 13, wherein the at least one alert condition is selected from the group consisting of a connection to the teleconference by the first user, an exceeding of an individual participant activity level threshold by the first user, a falling below of the individual participant activity level threshold by the first user, and a disconnection from the teleconference by the first user.

16. The computer system of claim 13, wherein the notification method is selected from the group consisting of flashing a name of the first user, sending a text message to a personal communications device, sending a text message to an internet protocol address, and sounding a tone.

17. The computer system of claim 13, further comprising program instructions, stored on at least one of the one or more storage devices for execution by at least one of the one or more processors via at least one of the one or more memories, to maintain a log history of the teleconference, wherein the log history includes a record of the occurrence of the at least one alert condition as indicated by a timestamp included in the notification, and wherein the timestamp indicates a time of the occurrence of the at least one alert condition.

* * * * *